US010811189B2

(12) United States Patent
Imamura et al.

(10) Patent No.: US 10,811,189 B2
(45) Date of Patent: Oct. 20, 2020

(54) FILM CAPACITOR INCLUDING BUS BARS HAVING OVERLAPPING PORTIONS WITH AN INSULATING PART DISPOSED THEREBETWEEN

(71) Applicant: Panasonic Intellectual Property Management Co., Ltd., Osaka (JP)

(72) Inventors: Takeshi Imamura, Toyama (JP); Toshihisa Miura, Toyama (JP); Eriko Kanatani, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 143 days.

(21) Appl. No.: 16/052,200

(22) Filed: Aug. 1, 2018

(65) Prior Publication Data

US 2018/0342354 A1 Nov. 29, 2018

Related U.S. Application Data

(63) Continuation of application No. PCT/JP2017/006265, filed on Feb. 21, 2017.

(30) Foreign Application Priority Data

Feb. 25, 2016 (JP) ................................. 2016-034174

(51) Int. Cl.
*H01G 4/228* (2006.01)
*H01G 4/224* (2006.01)
(Continued)

(52) U.S. Cl.
CPC ............... *H01G 4/228* (2013.01); *H01G 2/04* (2013.01); *H01G 2/103* (2013.01); *H01G 4/224* (2013.01);
(Continued)

(58) Field of Classification Search
CPC .......... H01G 4/228; H01G 4/38; H01G 4/224; H01G 4/18; H01G 4/40; H01G 2/103
See application file for complete search history.

(56) References Cited

U.S. PATENT DOCUMENTS 9,107,319 B2 * 8/2015 Jeong .................... H05K 7/1432
10,381,943 B2 * 8/2019 Nishizawa ............. H02M 7/537
(Continued)

FOREIGN PATENT DOCUMENTS

JP  2006-295997 A  10/2006
JP  2008061282 A * 3/2008 ............. H01G 4/224
(Continued)

OTHER PUBLICATIONS

International Search Report of PCT application No. PCT/JP2017/006265 dated May 16, 2017.

*Primary Examiner* — David M Sinclair
(74) *Attorney, Agent, or Firm* — McDermott Will & Emery LLP

(57) ABSTRACT

A rear bus bar includes a rear electrode connecting part connected to an upper end electrode of a capacitor element, and a rear overlapping part is led out upward from a rear electrode connecting part at a position overlapping with the upper end electrode. A front bus bar includes a front electrode connecting part connected to a lower end electrode of the capacitor element, a first relay part, and a second relay part extending along the upper end electrode, and a front overlapping part is led out upward from the second relay part. An insulation module includes a first insulating part interposed between the front overlapping part and the rear overlapping part, and a second insulating part interposed between the upper end electrode and the second relay part.

6 Claims, 14 Drawing Sheets

(51) Int. Cl.
  *H01G 4/38* (2006.01)
  *H01G 2/04* (2006.01)
  *H01G 4/40* (2006.01)
  *H01G 2/10* (2006.01)
  *H01G 4/33* (2006.01)
  *H01G 4/18* (2006.01)

(52) U.S. Cl.
  CPC ............... *H01G 4/33* (2013.01); *H01G 4/38* (2013.01); *H01G 4/40* (2013.01); *H01G 4/18* (2013.01)

(56) References Cited

U.S. PATENT DOCUMENTS

| | | | |
|---|---|---|---|
| 2011/0149472 A1* | 6/2011 | Yang | H01G 4/228 361/330 |
| 2017/0256360 A1* | 9/2017 | Yang | H01G 4/38 |

FOREIGN PATENT DOCUMENTS

| | | | | |
|---|---|---|---|---|
| JP | 2010-251400 | | 11/2010 | |
| JP | 2012044097 A | * | 3/2012 | |
| JP | 2015-095627 | | 5/2015 | |
| WO | WO-2014027720 A1 | * | 2/2014 | ............... H01G 9/08 |

* cited by examiner

FIG.2B
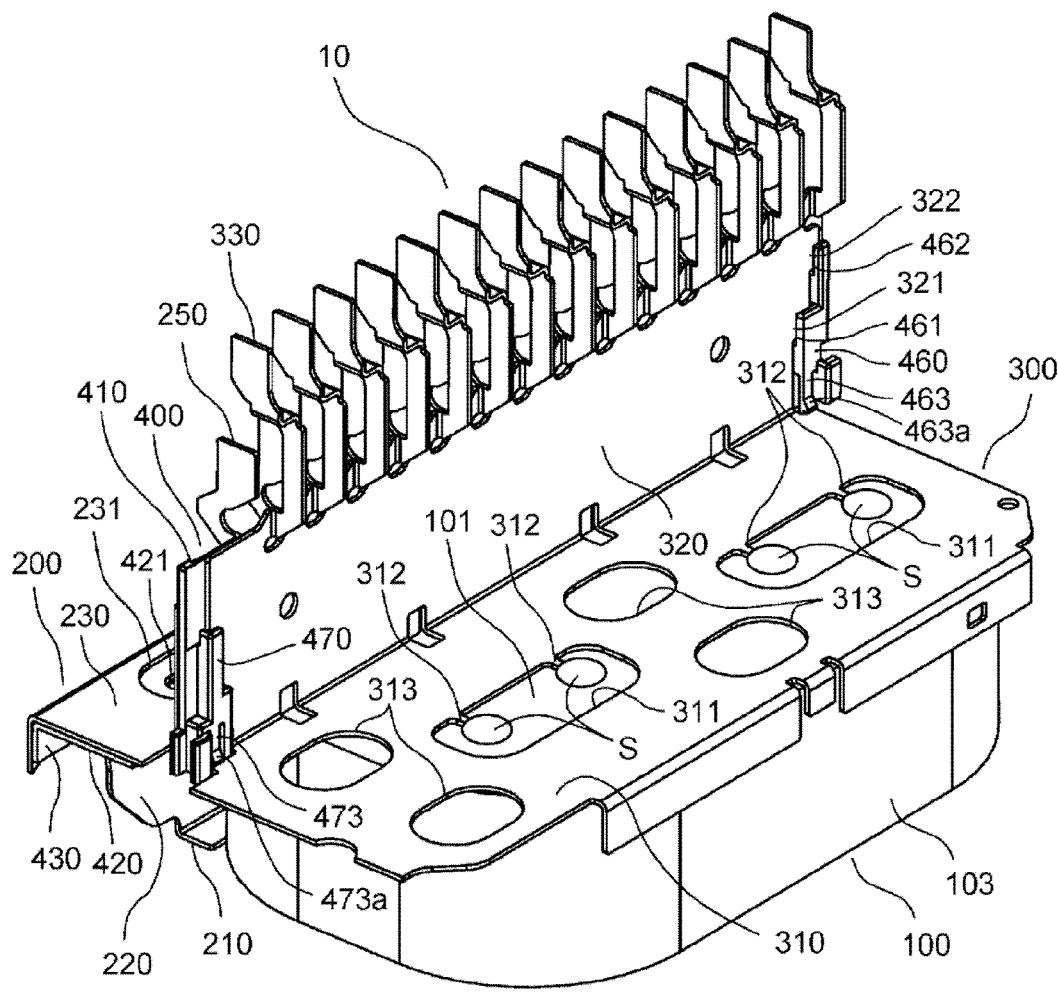
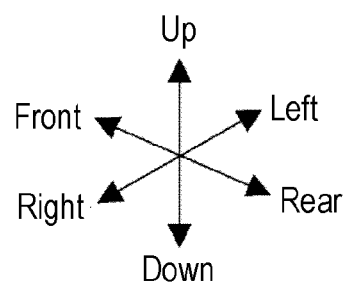

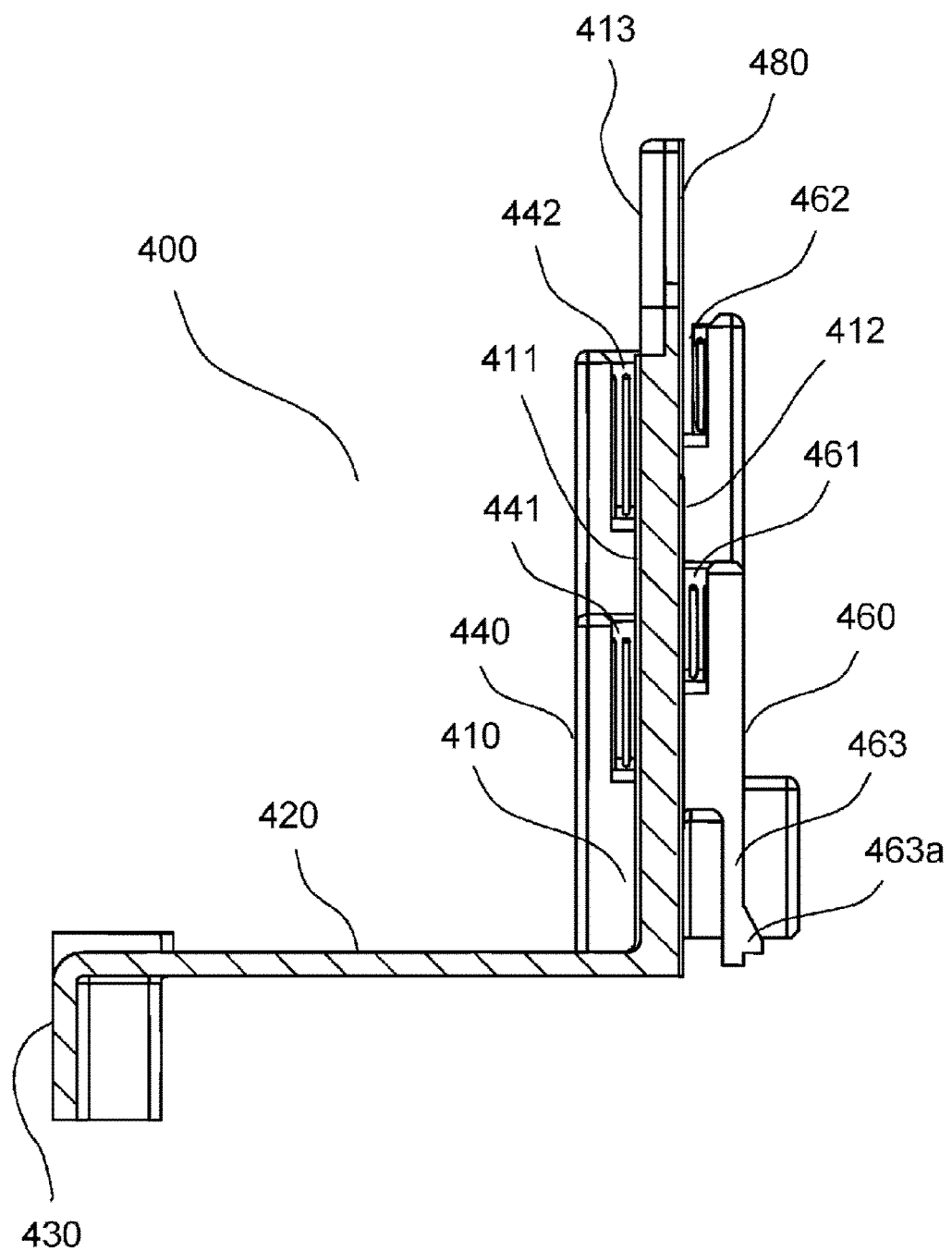

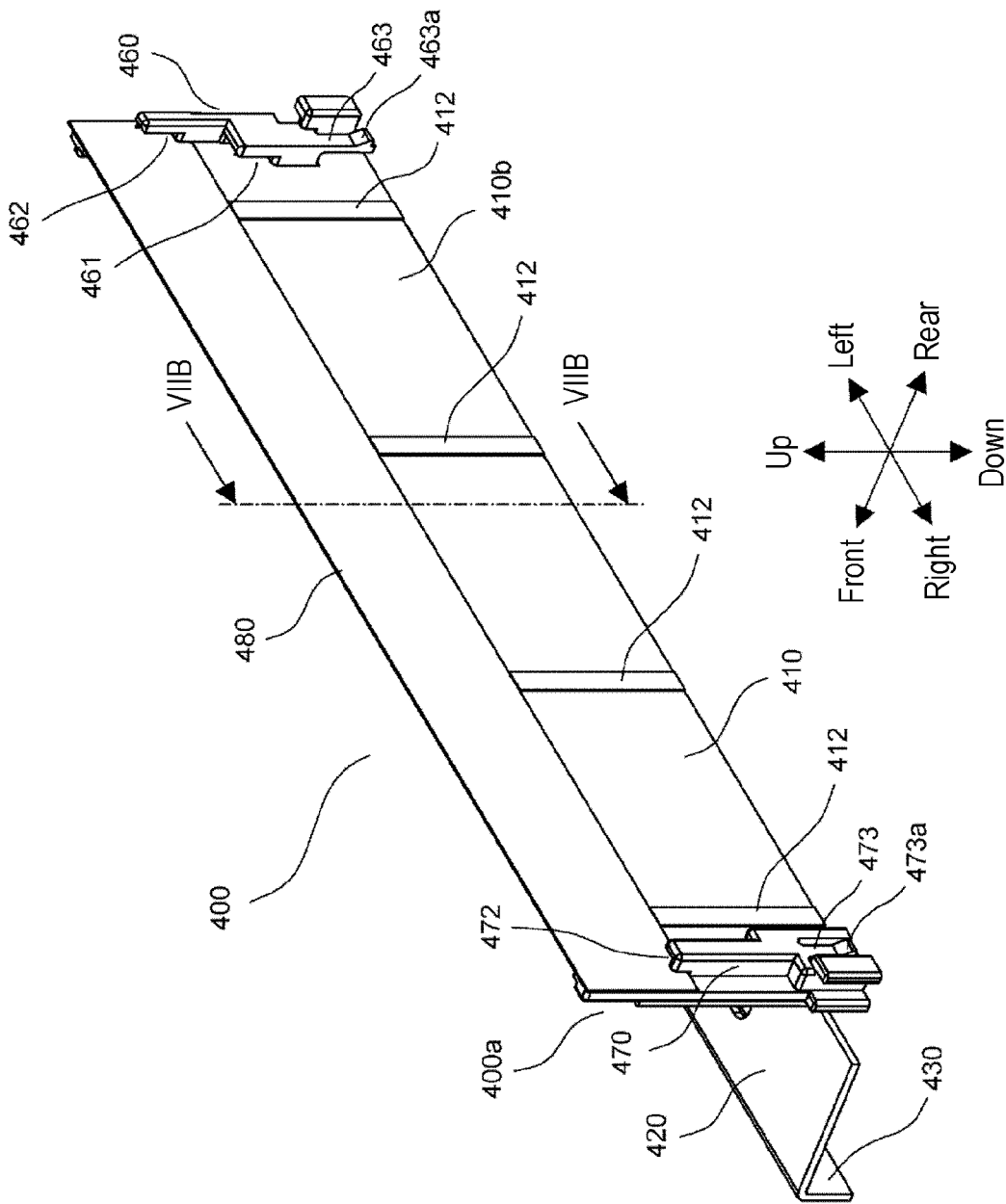

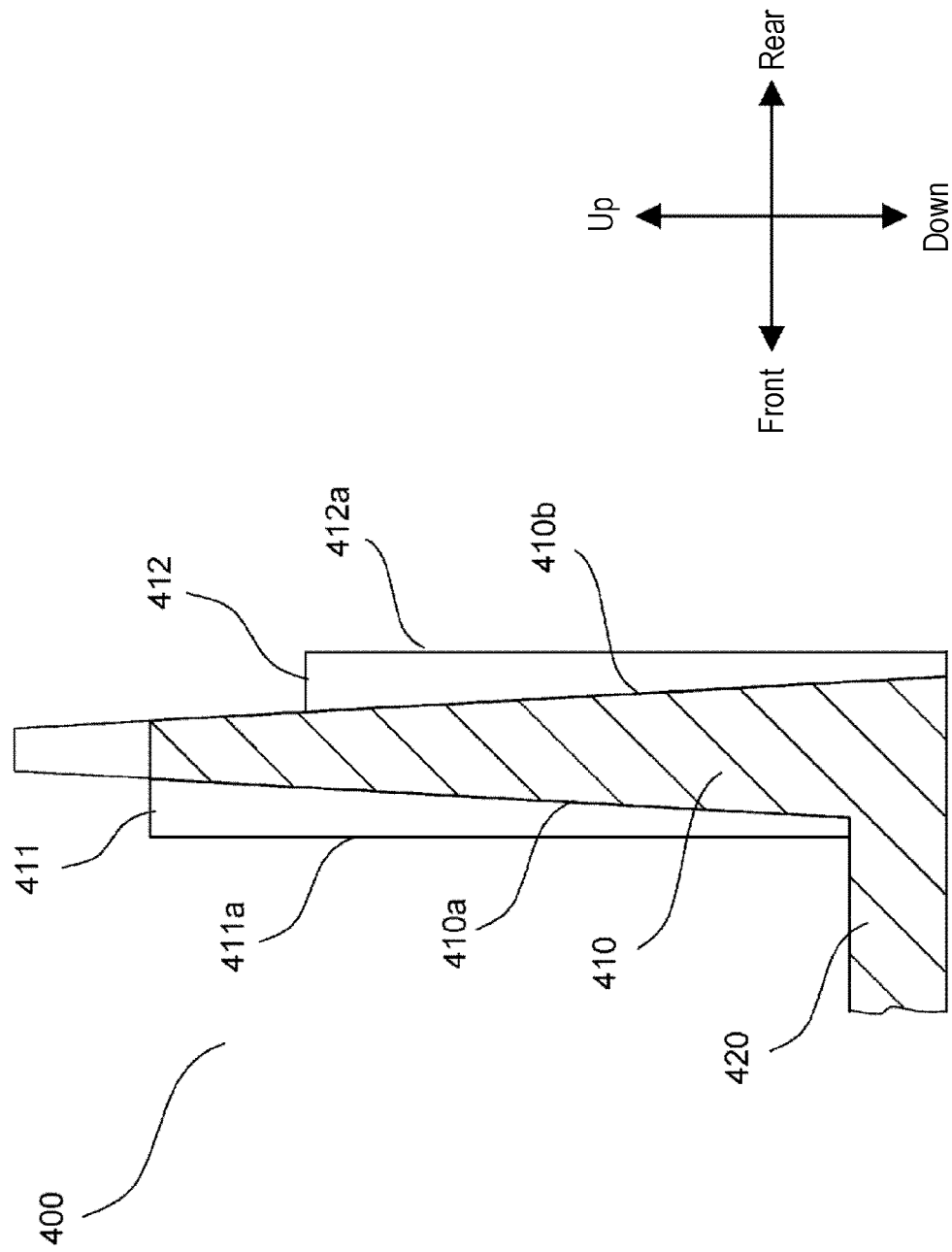

FILM CAPACITOR INCLUDING BUS BARS HAVING OVERLAPPING PORTIONS WITH AN INSULATING PART DISPOSED THEREBETWEEN

BACKGROUND

1. Technical Field

The present disclosure relates to a film capacitor.

2. Description of the Related Art

Some of conventional film capacitors include a capacitor element made of laminated or wound metallized film, end electrodes formed on both end faces of the capacitor element, and bus bars each connected at one end to each end electrode and having at the other end an external connecting terminal to be connected to an external device. Examples of such capacitors include a capacitor configured to reduce an equivalent series inductance (ESL) as an inductance component of the bus bars by overlapping two bus bars partly with each other with an insulating member interposed between the two bus bars.

For such film capacitors, a capacitor element may have a configuration in which an external connecting terminal is led out in a direction vertical to an end electrode as described, for example, in PTL 1, and a configuration in which an external connecting terminal is led out in a direction parallel to an end electrode as described, for example, in PTL 2.

When the latter configuration is employed, in a case molded capacitor (film capacitor) described in PTL 2, a P pole bus bar and a N pole bus bar are led out from positions deviated from the end electrode in plan view of the end electrode of the capacitor element and overlap with each other at the deviated positions with an inter-electrode insulating member interposed between the P pole bus bar and the N pole bus bar.

CITATION LIST

Patent Literature

PTL 1: JP 2010-251400 A
PTL 2: JP 2015-095627 A

SUMMARY

In the case molded capacitor disclosed in PTL 2, since the P pole bus bar and the N pole bus bar are led out from positions deviated from the end electrode, the capacitor element may increase in size in the direction along the end electrode. To overcome this problem, parts of the two bus bars which overlap with each other with the insulating member interposed between the parts, that is, two overlapping parts may be disposed at positions overlapped with the end electrode of the capacitor element.

However, in this configuration, parts of the bus bars extending along the end electrode may come into contact with the end electrode, the parts of the bus bars having an opposite polarity from the polarity of the end electrode on the side where the two overlapping parts are disposed.

In view of such problems, it is an object of the present disclosure to provide a film capacitor enabling miniaturization.

A film capacitor according to a principal aspect of the present disclosure includes: a capacitor element; a first bus bar connected to the capacitor element; a second bus bar connected to the capacitor element; a first overlapping part included in the first bus bar; a second overlapping part included in the second bus bar, the first overlapping part and the second overlapping part overlapping with each other; and an insulating part configured to insulate the first overlapping part and the second overlapping part. The first bus bar includes a first electrode connecting part connected to a first end electrode formed on one end face of the capacitor element, and the first overlapping part is led out from the first electrode connecting part at a position overlapping with the first end electrode in a direction that the first end electrode face, The second bus bar includes a second electrode connecting part connected to a second end electrode formed on a second end face of the capacitor element, and a relay part extending from the second electrode connecting part along a periphery of the capacitor element toward the first end electrode, extending along the first end electrode toward the first overlapping part, and connecting the second electrode connecting part, and the second overlapping part is led out from the relay part in a direction that the first end electrode faces. The insulating part includes a first insulating part interposed between the first overlapping part and the second overlapping part and a second insulating part extending from the first insulating part along the first end electrode and being interposed between the first end electrode and the relay part.

The present disclosure can provide a film capacitor enabling miniaturization.

Effects or meanings of the present disclosure will be further clarified in the following description of the exemplary embodiment. However, the exemplary embodiment described below is merely examples in carrying out the present disclosure, and the present disclosure is not at all limited to the examples described in the following exemplary embodiment.

BRIEF DESCRIPTION OF THE DRAWINGS

FIG. 2B is a rear perspective view of a capacitor unit according to the exemplary embodiment;

FIG. 6B is a cross-sectional view of the insulation module taken along line VIB-VIB of FIG. 6A;

FIG. 7A is a rear perspective view of the insulation module according to the exemplary embodiment;

FIG. 8 is a cross-sectional view of a principal portion of the insulation module schematically illustrating a tapered shape of first insulating part in an exaggerated manner according to the exemplary embodiment.

DETAILED DESCRIPTION

Figure 1:
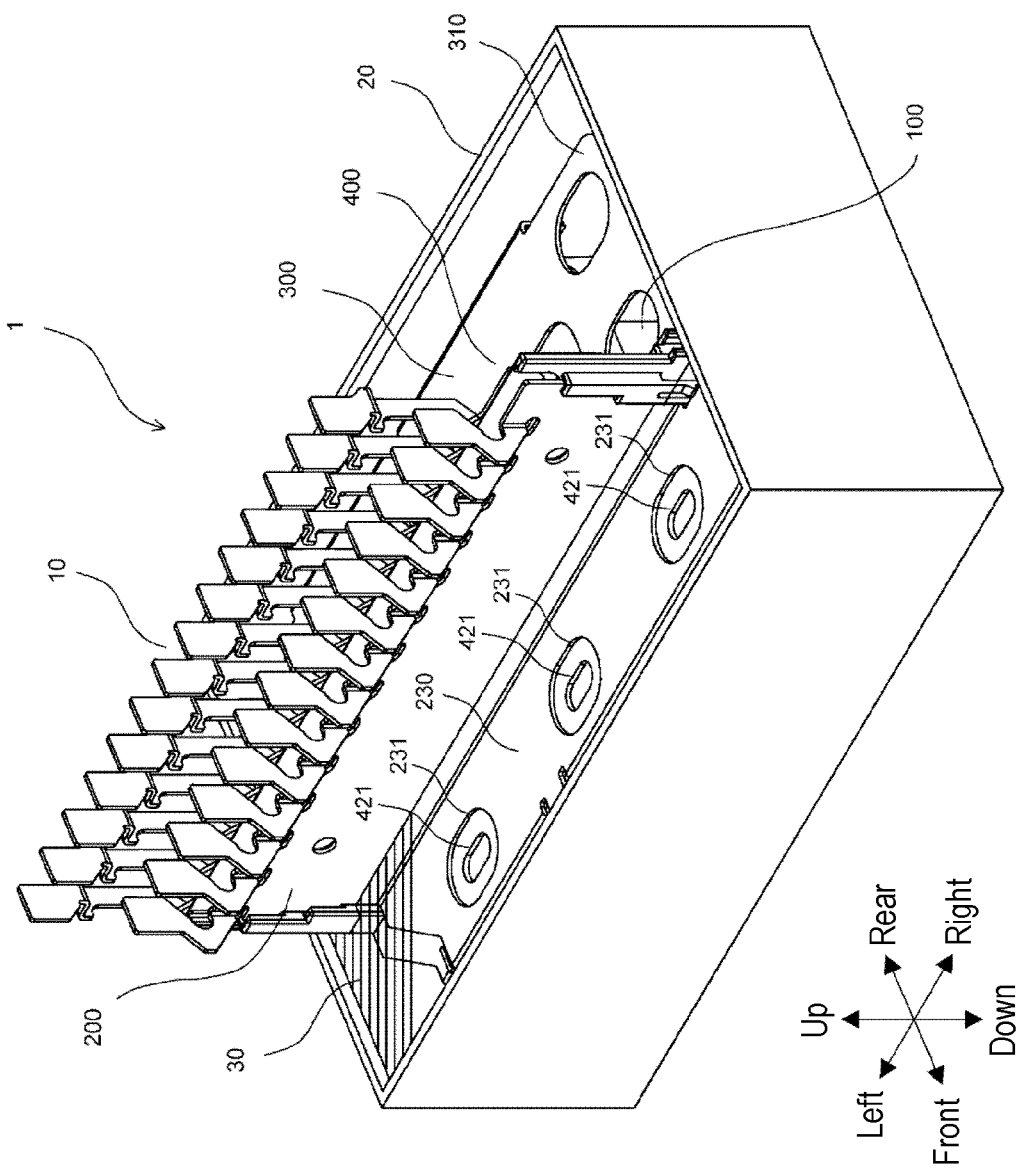
FIG. 1 is an elevation perspective view of a film capacitor according to an exemplary embodiment.

Hereinafter, an exemplary embodiment of the present disclosure will be described with reference to the drawings. For the sake of convenience, directions including front and rear, right and left, and up and down are added to the drawings as appropriate. These directions are not absolute directions but relative directions in relation to an orientation of film capacitor 1.

In the exemplary embodiment, upper end electrode 101 corresponds to "first end electrode" described in claims. Lower end electrode 102 corresponds to "second end electrode" described in claims. Front bus bar 200 corresponds to "second bus bar" described in claims. Front electrode connecting part 210 corresponds to "second electrode connecting part" described in claims. First relay part 220 and a second relay part 230 constitute "relay part" described in claims. Openings 231 correspond to "first opening" described in claims. Front overlapping part 240 corresponds to "second overlapping part" described in claims. Rear bus bar 300 corresponds to "first bus bar" described in claims. Rear electrode connecting part 310 corresponds to "first electrode connecting part" described in claims. Rear overlapping part 320 corresponds to "first overlapping part" described in claims. Insulation module 400 corresponds to "insulating part" described in claims. First insulating part 410 corresponds to "first insulating part" described in claims. Front rib 411 corresponds to "second rib" described in claims, and rear rib 412 corresponds to "first rib" described in claims. Second insulating part 420 corresponds to "second insulating part" described in claims. Opening 421 corresponds to "second opening" described in claims. Third insulating part 430 corresponds to "third insulating part" described in claims.

However, the above-mentioned description only aims to correlate the structure in claims and the structure in the exemplary embodiment, and the above-mentioned correlation does not limit the invention described in claims to the structure of the exemplary embodiment.

FIG. 1 is an elevation perspective view of film capacitor 1 according to the exemplary embodiment. In FIG. 1, a part of filling resin 30 is hatched and the remaining part (not hatched) of filling resin 30 is transparent for the sake of convenience.

As illustrated in FIG. 1, film capacitor 1 includes capacitor unit 10, case 20, and filling resin 30.

Capacitor unit 10 includes capacitor element 100, front bus bar 200, rear bus bar 300, and insulation module 400. Capacitor unit 10 extracts electricity from capacitor element 100 via front bus bar 200 and rear bus bar 300 and supplies the extracted electricity to an external device. Case 20 has a vertically flat and a substantially rectangular parallelepiped shape with an opened upper face. Case 20 is made, for example, of a resin material such as Poly Phenylene Sulfide (PPS), and houses capacitor unit 10. Filling resin 30 is formed by filling case 20 with a melted resin and cooling the filled resin. Case 20 is filled with filling resin 30 to a level where second relay part 230 of front bus bar 200 and rear electrode connecting part 310 of rear bus bar 300 are embedded. Filling resin 30 covers capacitor element 100 and parts of front bus bar 200, rear bus bar 300, and insulation module 400 to protect capacitor element 100 and parts of front bus bar 200, rear bus bar 300, and insulation module 400 from moisture and impacts.

A configuration of capacitor unit 10 will be described in detail below.

Figure 2A:
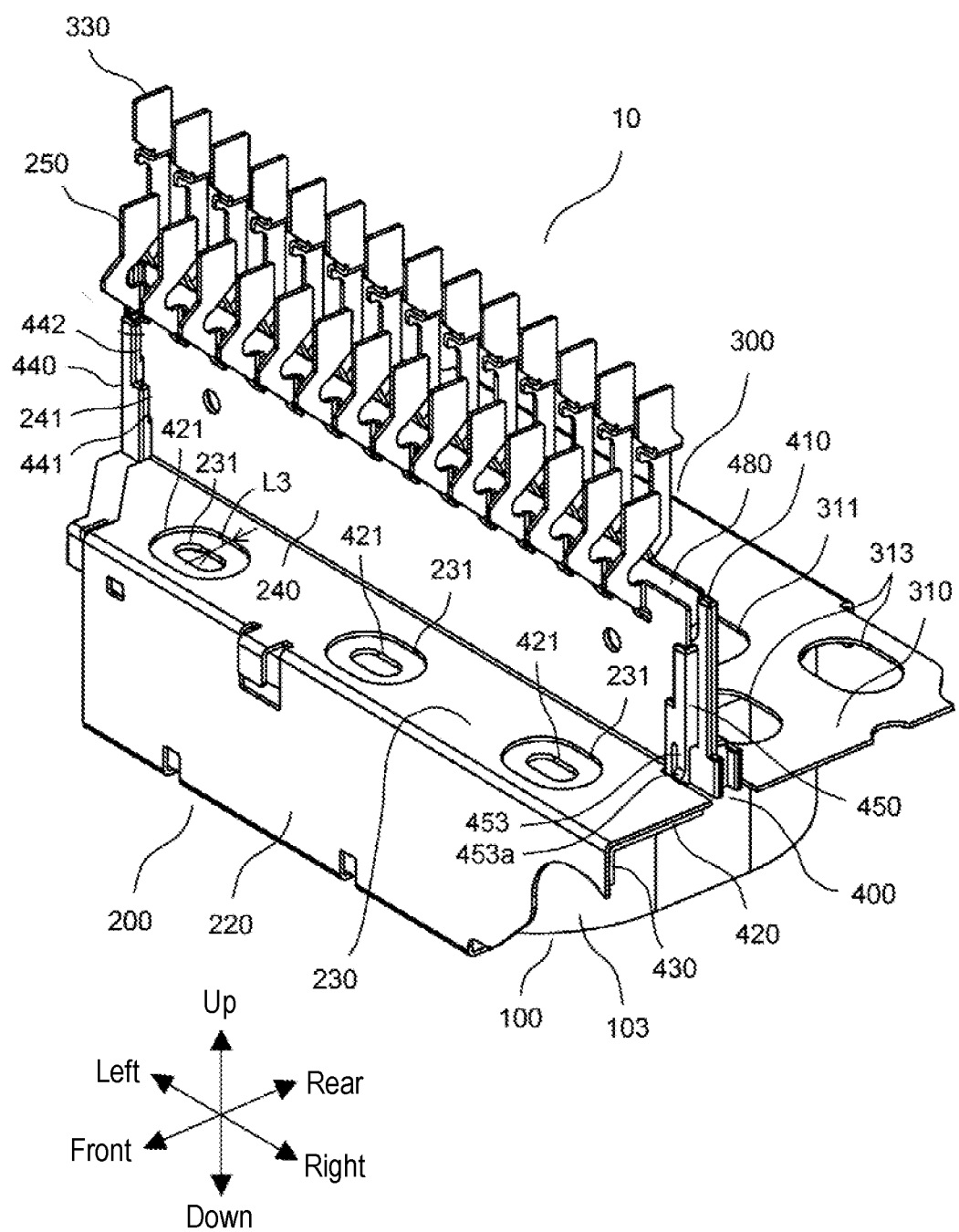
FIG. 2A is an elevation perspective view of a capacitor unit according to the exemplary embodiment.
Figure 3:
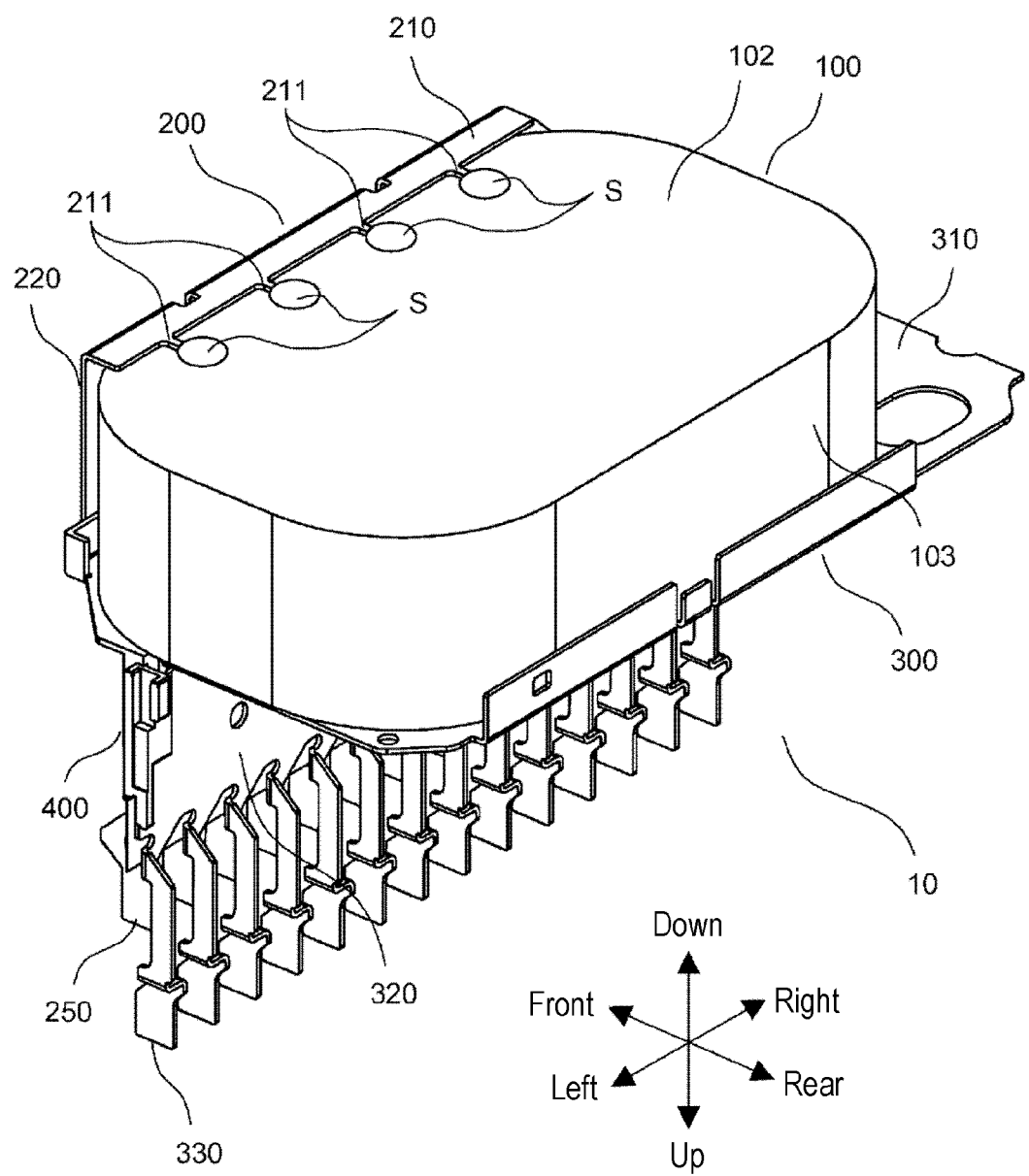
FIG. 3 is a rear perspective view of a capacitor unit turned upside down according to the exemplary embodiment.
Figure 4A:
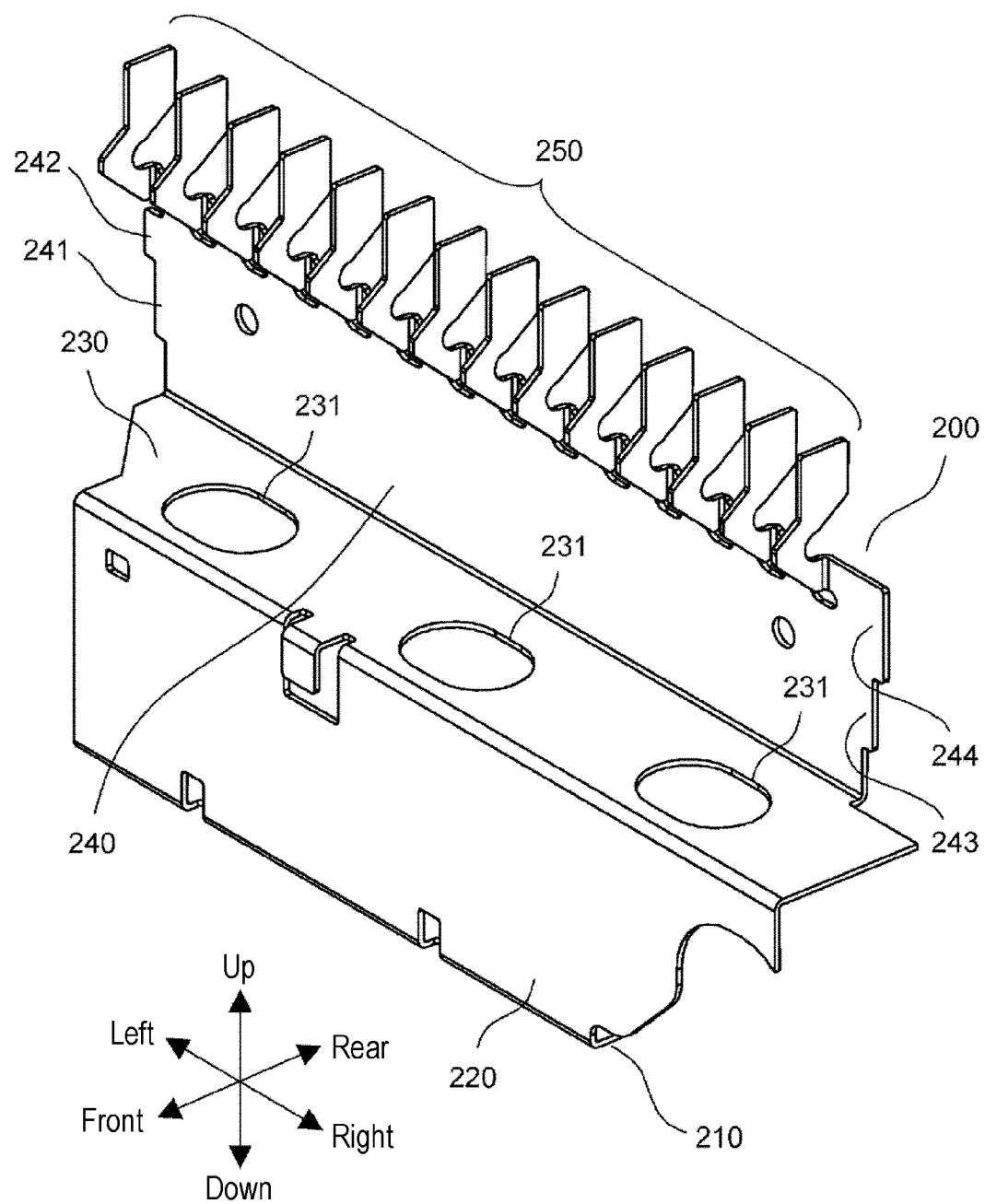
FIG. 4A is an elevation perspective view of a front bus bar according to the exemplary embodiment.
Figure 4B:
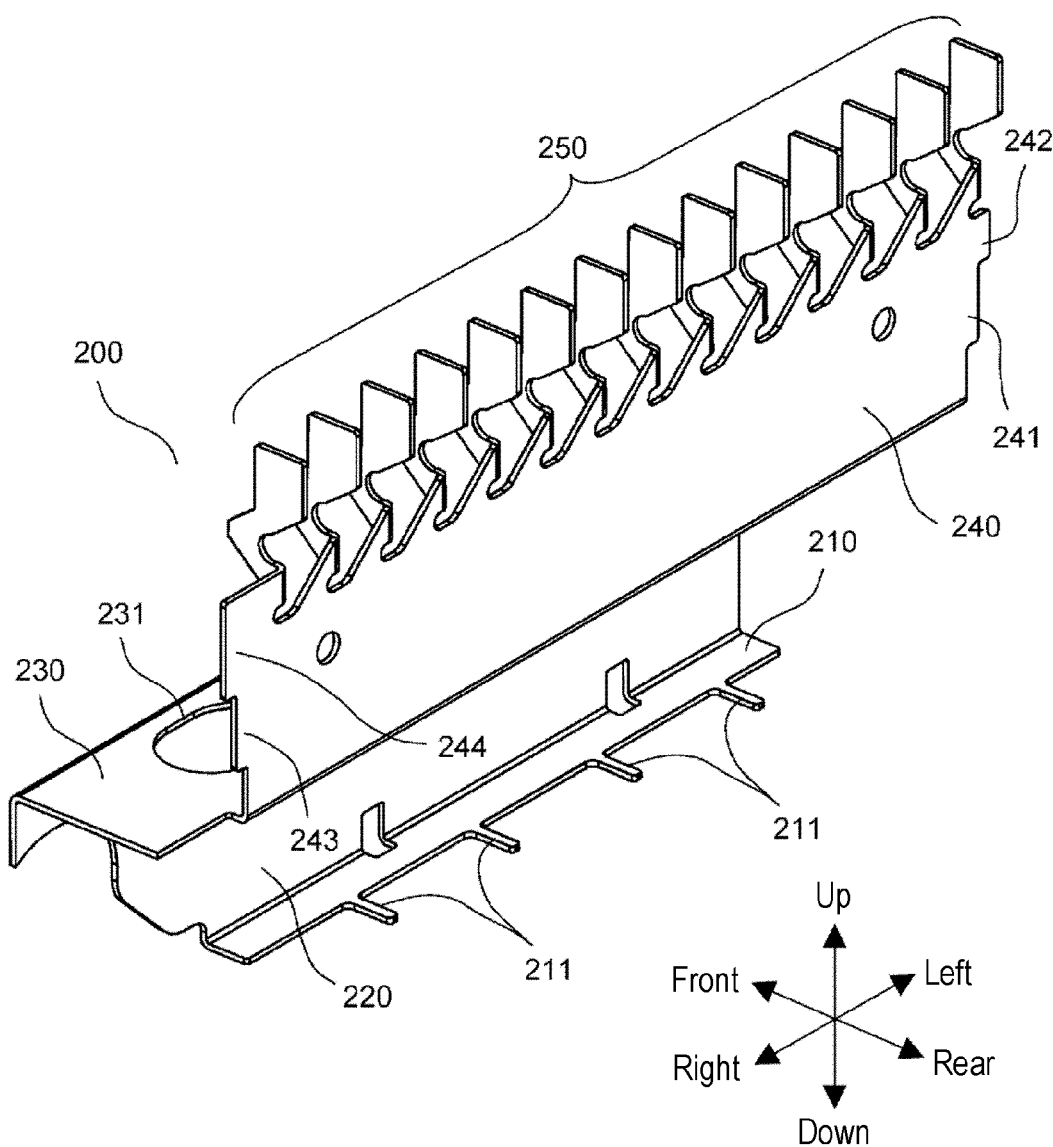
FIG. 4B is a rear perspective view of the front bus bar according to the exemplary embodiment.
Figure 5A:
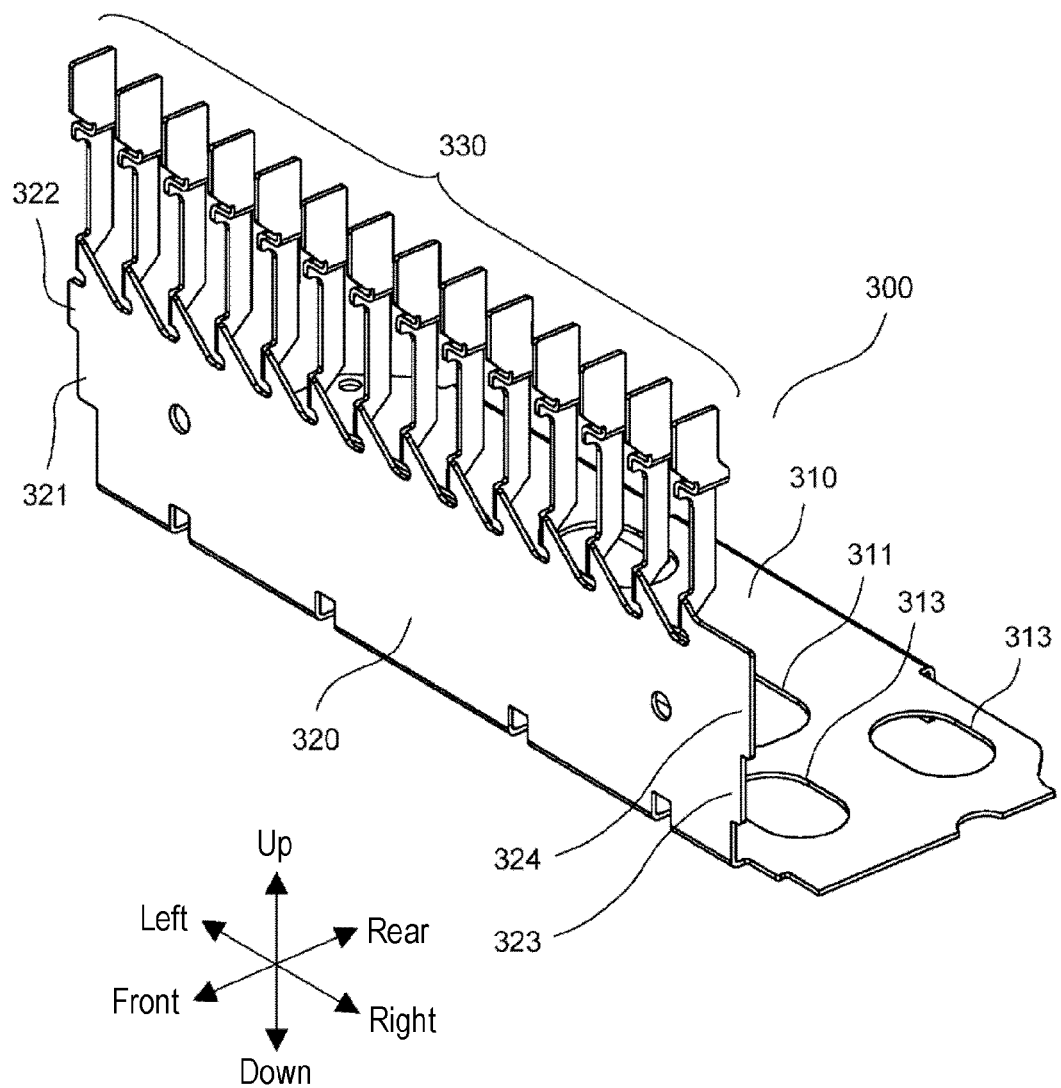
FIG. 5A is an elevation perspective view of a rear bus bar according to the exemplary embodiment.
Figure 5B:
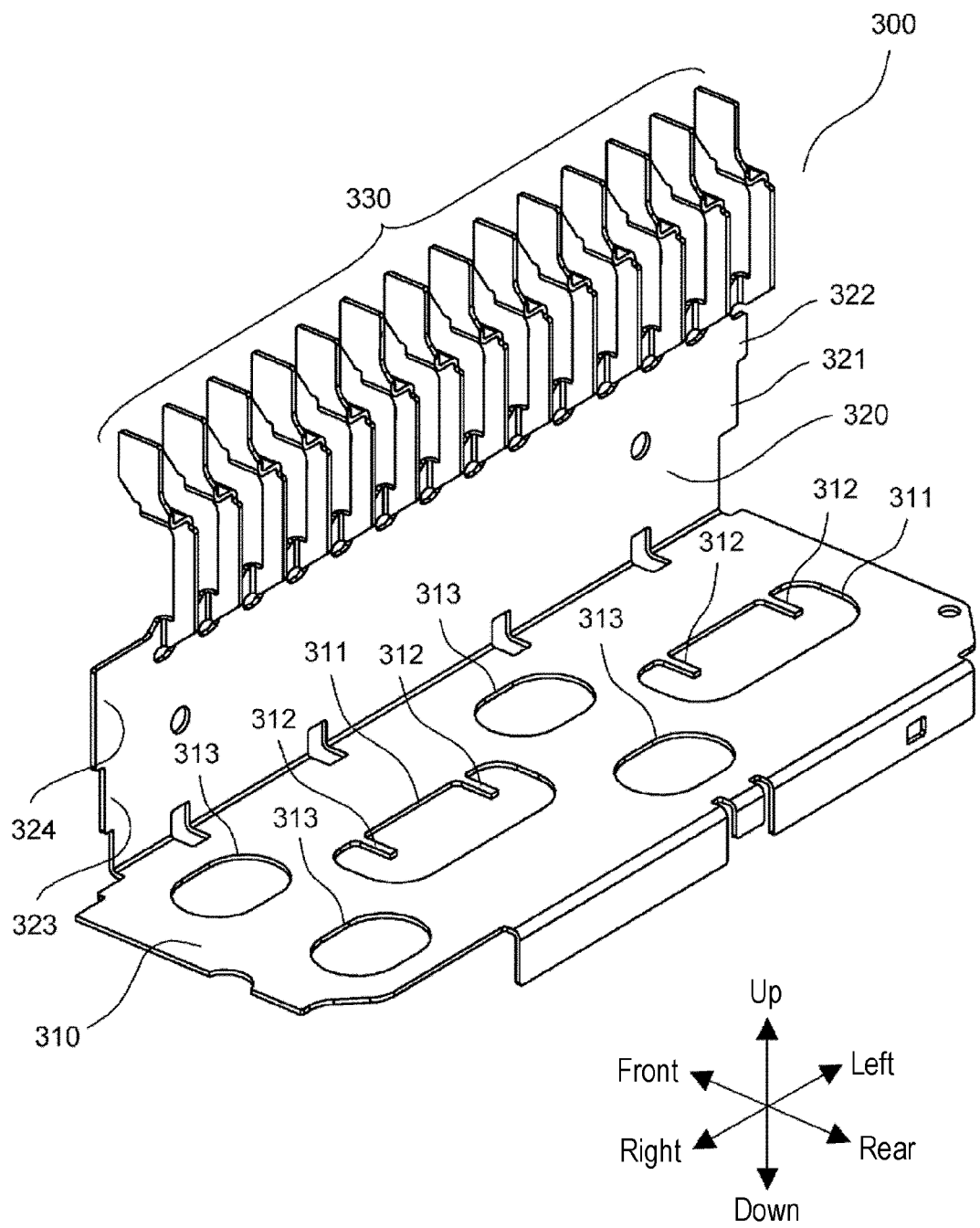
FIG. 5B is a rear perspective view of the rear bus bar according to the exemplary embodiment.
Figure 6A:
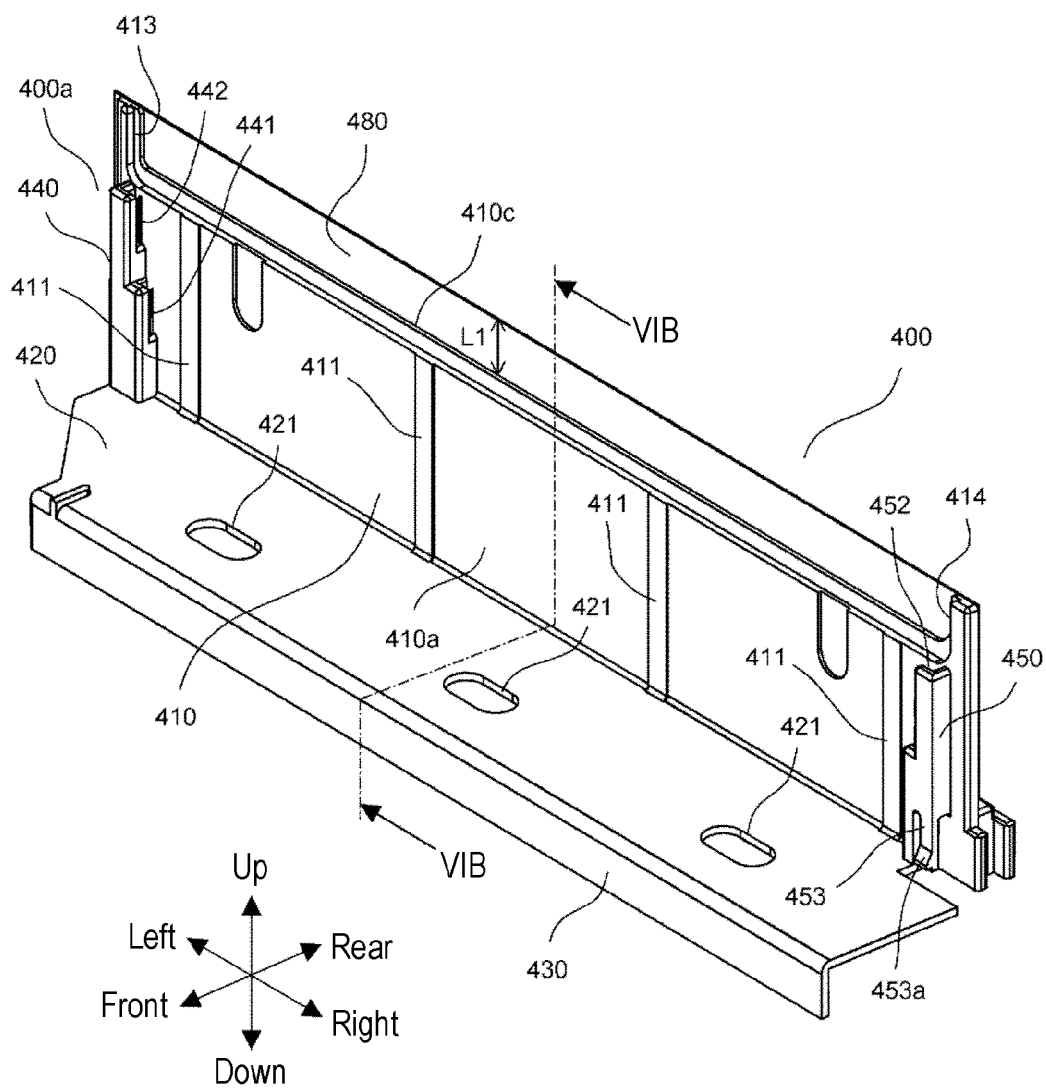
FIG. 6A is an elevation perspective view of an insulation module according to the exemplary embodiment.
Figure 7B:
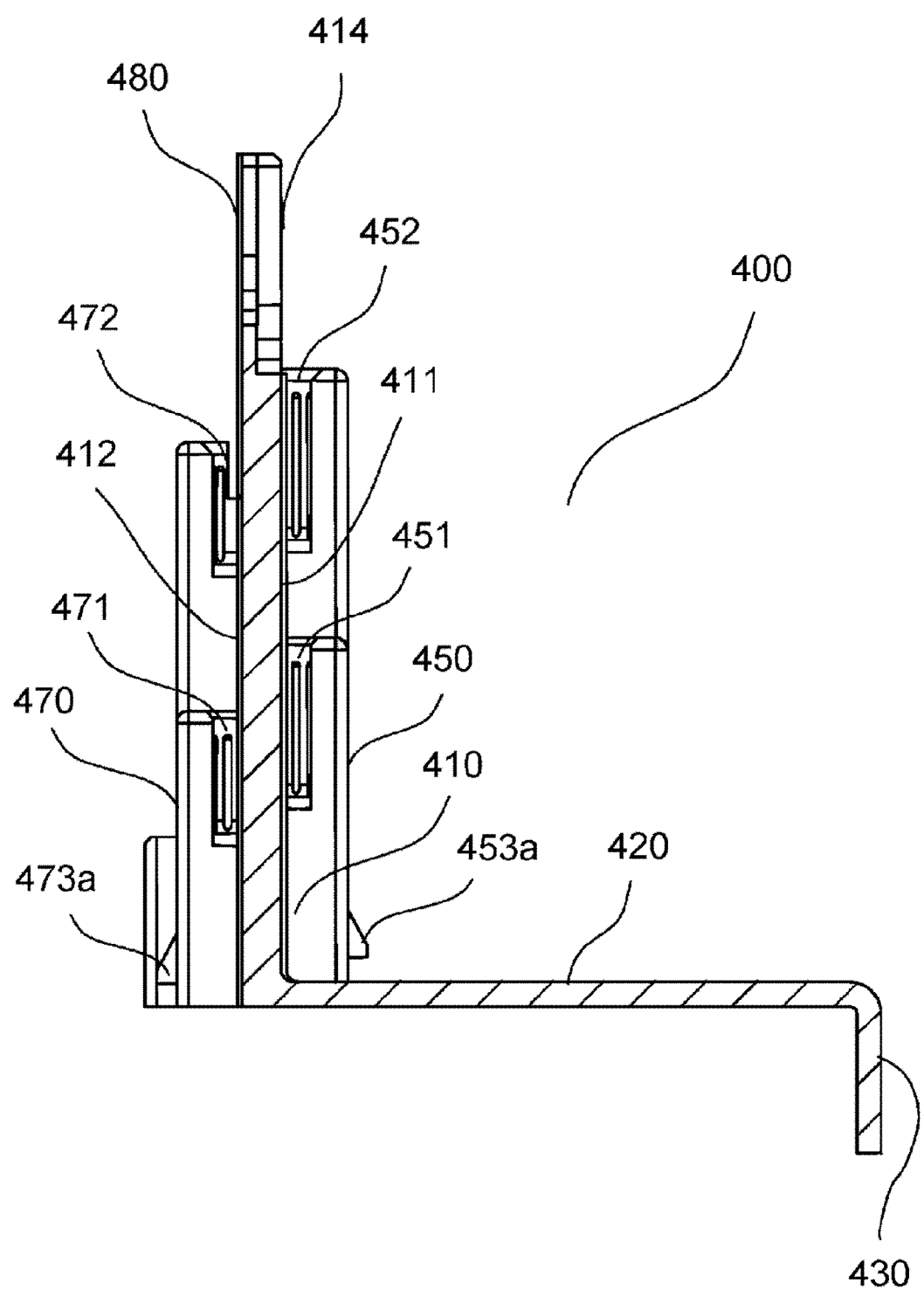
FIG. 7B is a cross-sectional view of the insulation module taken along line VIIB-VIIB of FIG. 7A.
Figure 9:
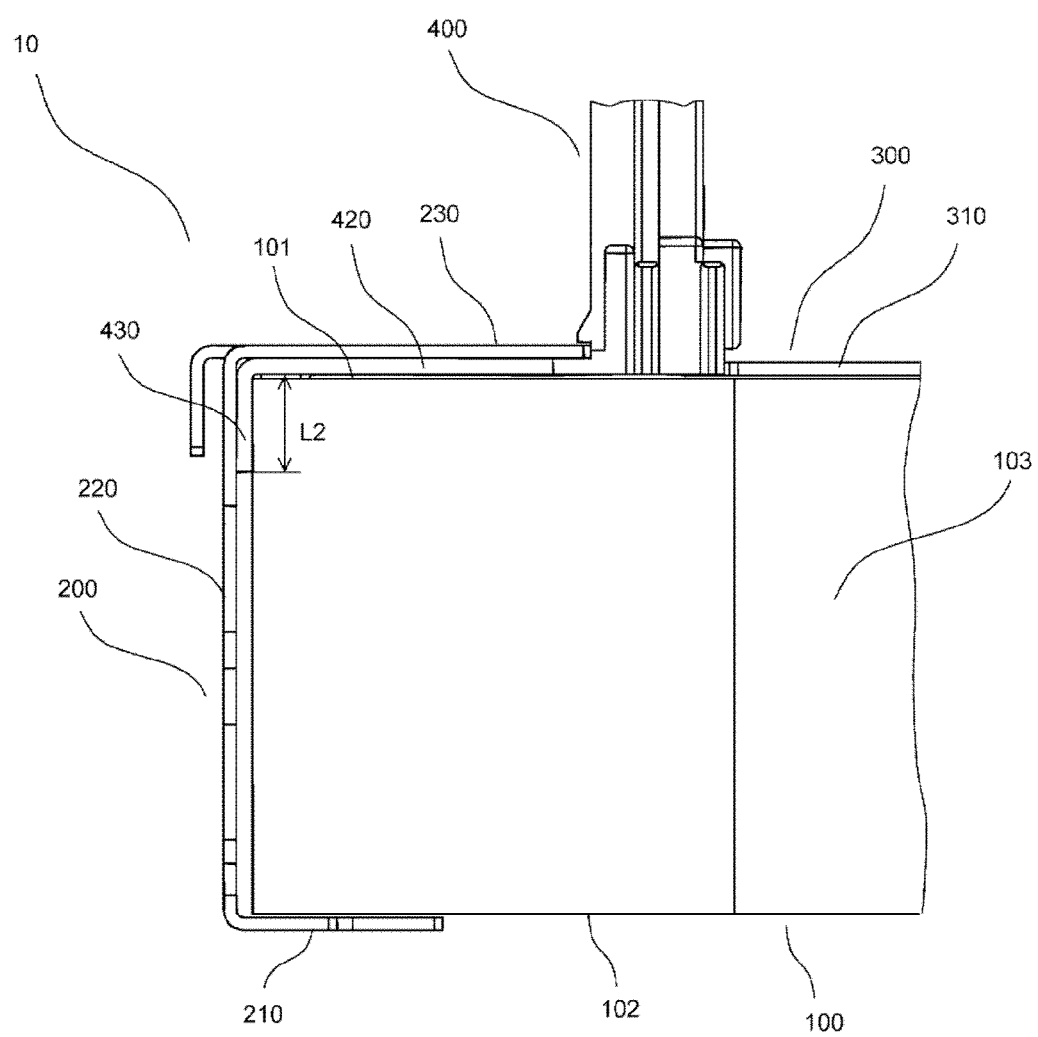
FIG. 9 is a side view of a principal portion of the capacitor unit according to the exemplary embodiment.

FIG. 2A is an elevation perspective view of capacitor unit 10 according to the exemplary embodiment, and FIG. 2B is a rear perspective view of capacitor unit 10 according to the exemplary embodiment. FIG. 3 is a rear perspective view of capacitor unit 10 turned upside down according to the exemplary embodiment. FIG. 4A and FIG. 4B are respectively an elevation perspective view and a rear perspective view of front bus bar 200 according to the exemplary embodiment. FIG. 5A and FIG. 5B are respectively an elevation perspective view and a rear perspective view of rear bus bar 300 according to the exemplary embodiment. FIG. 6A is an elevation perspective view of insulation module 400, and FIG. 6B is a cross-sectional view of insulation module 400 taken along line VIB-VIB of FIG. 6A according to the exemplary embodiment. FIG. 7A is a rear perspective view of insulation module 400, and FIG. 7B is a cross-sectional view of insulation module 400 taken along line VIIB-VIIB of FIG. 7A according to the exemplary embodiment. FIG. 8 is a cross-sectional view of a principal portion of insulation module 400 schematically illustrating a tapered shape of first insulating part 410 in an exaggerated manner according to the exemplary embodiment. FIG. 9 is a side view of a principal portion of capacitor unit 10 according to the exemplary embodiment.

Capacitor element 100 is produced by layering two metallized films each formed by vapor depositing aluminum on a dielectric film, winding or laminating the layered metallized films, and pressing a periphery of the wound or laminated metallized films into a flat shape. Capacitor element 100 is oriented with end faces directed the up-down direction. Capacitor element 100 includes upper end electrode 101 formed on an upper end face by spraying metallikon metal such as zinc. Similarly, capacitor element 100 also includes lower end electrode 102 formed on lower end face by spraying metallikon metal such as zinc. Although capacitor element 100 of the exemplary embodiment is produced from the metallized films formed by vapor depositing aluminum on dielectric films, capacitor element 100 may be produced from metallized films formed by vapor depositing a metal, such as zinc or magnesium, other than aluminum. Alternatively, from among such metals, capacitor element 100 may be produced either from metallized films formed by vapor depositing a plurality of metals or from metallized films formed by vapor depositing an alloy of such metals.

As illustrated in FIGS. 4A and 4B, front bus bar 200 is made of a conductive material such as a copper plate and includes front electrode connecting part 210, first relay part 220, second relay part 230, front overlapping part 240, and fourteen connection terminals 250. Front bus bar 200 is formed, for example, by appropriately cutting out and bending one copper plate. Front electrode connecting part 210, first relay part 220, second relay part 230, front overlapping part 240, and fourteen connection terminals 250 are integrated.

Front electrode connecting part 210 has a plate shape elongated in the left-and-right direction. Front electrode connecting part 210 includes four electrode terminals 211 at a rear end. First relay part 220 and second relay part 230 connect front electrode connecting part 210 and front overlapping part 240. First relay part 220 has a plate shape elongated in the left-and-right direction and extends upward from a front end of front electrode connecting part 210. Second relay part 230 has a plate shape elongated in the left-and-right direction and extends rearward from an upper end of first relay part 220. Second relay part 230 includes openings 231 at three positions aligned in the left-and-right direction, and openings 231 have an oval shape elongated in the left-and-right direction.

Front overlapping part 240 has a plate shape elongated in the left-and-right direction and extends upward from a rear end of second relay part 230. Front overlapping part 240 includes first lower insertion part 241 having a rectangular shape and protruding leftward from a left end of front overlapping part 240. Front overlapping part 240 also includes first upper insertion part 242 having a rectangular shape and protruding leftward further with respect to first lower insertion part 241. First upper insertion part 242 is formed above first lower insertion part 241. Likewise, front overlapping part 240 includes second lower insertion part 243 having a rectangular shape and protruding rightward from a right end of front overlapping part 240. Front overlapping part 240 also includes second upper insertion part 244 having a rectangular shape and protruding rightward further with respect to second lower insertion part 243. Second upper insertion part 244 is formed above second lower insertion part 243.

Fourteen connection terminals 250 are aligned at an upper end of front overlapping part 240 at predetermined intervals in the left-and-right direction. Connection terminals 250 are bent at lower ends by a substantially right angle with respect to front overlapping part 240 and thus both faces of connection terminals 250 face leftward and rightward. Terminals (not illustrated) from an external device are connected to connection terminals 250 by a fastening process such as soldering.

As illustrated in FIGS. 5A and 5B, rear bus bar 300 is made of a conductive material such as a copper plate, and includes rear electrode connecting part 310, rear overlapping part 320, and fourteen connection terminals 330. Rear bus bar 300 is formed, for example, by appropriately cutting out and bending one copper plate. Rear electrode connecting part 310, rear overlapping part 320, and fourteen connection terminals 330 are integrated.

Rear electrode connecting part 310 has a plate shape elongated in the left-and-right direction. Rear electrode connecting part 310 includes openings 311 having a rectangular shape elongated in the left-and-right direction at two positions aligned in the left-and-right direction. Openings 311 include two each of electrode terminals 312 at front edges of openings 311. Rear electrode connecting part 310 also includes openings 313 having an oval shape elongated in the left-and-right direction. Two each of openings 313 are formed between two openings 311 and on the right of opening 311 formed on the right side.

Rear overlapping part 320 has a plate shape elongated in the left-and-right direction and extends upward from a front end of rear electrode connecting part 310. Rear overlapping part 320 includes third lower insertion part 321 having a rectangular shape and protruding leftward from a left end of rear overlapping part 320. Rear overlapping part 320 also includes third upper insertion part 322 having a rectangular shape and protruding leftward further with respect to third lower insertion part 321. Third upper insertion part 322 is formed above third lower insertion part 321. Likewise, rear overlapping part 320 includes fourth lower insertion part 323 having a rectangular shape and protruding rightward from a right end of rear overlapping part 320. Rear overlapping part 320 also includes fourth upper insertion part 324 having a rectangular shape and protruding further rightward with respect to fourth lower insertion part 323. Fourth upper insertion part 324 is formed above fourth lower insertion part 323.

Fourteen connection terminals 330 are aligned at an upper end of rear overlapping part 320 at predetermined intervals in the left-and-right direction. Connection terminals 330 are bent at lower ends by a substantially right angle with respect to rear overlapping part 320 and thus both faces of connection terminals 330 face leftward and rightward. Terminals (not illustrated) from an external device are connected to connection terminals 330 by a fastening process such as soldering.

As illustrated in FIG. 6A to FIG. 7B, insulation module 400 includes first insulating part 410, second insulating part 420, third insulating part 430, front left holder 440, front right holder 450, rear left holder 460, rear right holder 470, and insulation paper 480. First insulating part 410, second insulating part 420, third insulating part 430, front left holder 440, front right holder 450, rear left holder 460, and rear right holder 470 constitute insulation body 400a, and insulation body 400a is integrally made of a resin material such as PPS by molding and has insulation properties.

First insulating part 410 has a plate shape elongated in the left-and-right direction. First insulating part 410 includes four front ribs 411 extending in the up-down direction and being arranged at predetermined intervals in the left-and-right direction on front face 410a of first insulating part 410. Likewise, first insulating part 410 includes four rear ribs 412 extending in the up-down direction and being arranged at predetermined intervals in the left-and-right direction on rear face 410b of first insulating part 410. As illustrated in FIG. 8, first insulating part 410 is tapered, that is, is gradually reduced in thickness as it goes upward (in a direction away from second insulating part 420) to facilitate demolding of an upper mold when a mold configured to be split in the up-down direction in FIG. 8 is used for molding insulation body 400a. Therefore, front face 410a and rear face 410b of first insulating part 410 are not parallel to each other. In contrast, front ribs 411 each protrude slightly forward from front face 410a of first insulating part 410 by an amount increasing as it goes upward, while rear ribs 412 each protrude slightly rearward from rear face 410b of first insulating part 410 by an amount increasing as it goes upward. Consequently, projecting faces 411a of front ribs 411 and projecting faces 412a of rear ribs 412 become parallel to each other. Although front ribs 411 and rear ribs 412 are formed integrally with insulation body 400a, the size of front ribs 411 and rear ribs 412 is small enough with respect to the size of insulation body 400a in the longitudinal direction and thus a process of demolding an upper mold can be performed without any interference during a molding process.

Second insulating part 420 has a plate shape elongated in the left-and-right direction and extends forward from a lower end of first insulating part 410. Second insulating part 420 includes three openings 421 at positions corresponding to the positions of three openings 231 formed in front bus bar 200, and openings 421 have an oval shape similar to the shape of openings 231. Openings 421 are smaller than openings 231. Third insulating part 430 has a plate shape elongated in the left-and-right direction and extends downward from a front end of second insulating part 420.

Front left holder 440 includes first lower insertion groove 441 and first upper insertion groove 442 both opening upward and rightward and extending along front face 410a of first insulating part 410 in the up-down direction. First upper insertion groove 442 is formed upward of first lower insertion groove 441 and leftward of first lower insertion groove 441. Front right holder 450 includes second lower insertion groove 451 and second upper insertion groove 452 both opening upward and leftward and extending along front face 410a of first insulating part 410 in the up-down direction. Second upper insertion groove 452 is formed upward of second lower insertion groove 451 and rightward of second lower insertion groove 451. Front right holder 450 includes engaging strip 453 formed at a lower portion. Engaging strip 453 includes claw 453a protruding forward from a distal end of engaging strip 453.

Rear left holder 460 includes third lower insertion groove 461 and third upper insertion groove 462 opening upward and rightward and extending along rear face 410b of first insulating part 410 in the up-down direction. Third upper insertion groove 462 is formed upward of third lower insertion groove 461 and leftward of third lower insertion groove 461. Rear left holder 460 includes engaging strip 463 formed at a lower portion. Engaging strip 463 includes claw 463a protruding rearward from a distal end of engaging strip 463. Rear right holder 470 includes fourth lower insertion groove 471 and fourth upper insertion groove 472 both opening upward and leftward and extending along rear face 410b of first insulating part 410 in the up-down direction. Fourth upper insertion groove 472 is formed upward of fourth lower insertion groove 471 and rightward of fourth lower insertion groove 471. Rear right holder 470 includes engaging strip 473 formed at a lower portion. Engaging strip 473 includes claw 473a protruding rearward from a distal end of engaging strip 473.

Insulation paper 480 is provided at upper end 410c of first insulating part 410 in such a way as to protrude upward. Upper end 410c of first insulating part 410 includes holders 413 and 414 at left and right sides for holding insulation paper 480. Insulation paper 480 has a thickness significantly smaller than the thickness of first insulating part 410 and is adhered to upper end 410c of first insulating part 410 and rear faces of left and right holders 413 and 414 in such a way as to be apart from front face 410a of first insulating part 410 by a predetermined distance.

As illustrated in FIG. 2A, first lower insertion part 241 and first upper insertion part 242 are inserted respectively into first lower insertion groove 441 and first upper insertion groove 442 from above. Likewise, second lower insertion part 243 and second upper insertion part 244 are inserted respectively into second lower insertion groove 451 and second upper insertion groove 452 from above. Consequently, front bus bar 200 is held by front left holder 440 and front right holder 450 with front overlapping part 240 closely facing front face 410a of first insulating part 410. In addition, claw 453a of engaging strip 453 holds down a front end of a right end of second relay part 230 to prevent front bus bar 200 from easily coming off upward. Front overlapping part 240 and first insulating part 410 may either be in contact with each other or be apart from each other via a small gap.

As illustrated in FIG. 2B, third lower insertion part 321 and third upper insertion part 322 are inserted respectively into third lower insertion groove 461 and third upper insertion groove 462 from above. Likewise, fourth lower insertion part 323 and fourth upper insertion part 324 are inserted respectively into fourth lower insertion groove 471 and fourth upper insertion groove 472 from above. Consequently, rear bus bar 300 is held by rear left holder 460 and rear right holder 470 with rear overlapping part 320 closely facing rear face 410b of first insulating part 410. In addition, claws 463a and 473a of left and right engaging strips 463 and 473 hold down left and right front ends of rear electrode connecting part 310 to prevent rear bus bar 300 from coming off upward. Rear overlapping part 320 and first insulating part 410 may either be in contact with each other or be apart from each other via a small gap.

In this manner, in capacitor unit 10, front overlapping part 240 of front bus bar 200 and rear overlapping part 320 of rear bus bar 300 overlap with each other in fore-and-aft direction, and first insulating part 410 is interposed between front bus bar 200 and rear bus bar 300. Front overlapping part 240 and rear overlapping part 320 are insulated from each other by first insulating part 410. Second insulating part 420 is disposed underneath second relay part 230 of front bus bar 200. Second insulating part 420 and second relay part 230 overlap with each other with centers of openings 231 substantially aligned with centers of openings 421. Consequently, openings 421 of second insulating part 420 are positioned at substantially centers of opening areas of openings 231 of second relay part 230.

As described with reference to FIG. 8, front face 410a and rear face 410b of first insulating part 410 are not parallel to each other, but projecting faces 411a of front ribs 411 and projecting faces 412a of rear ribs 412 are parallel to each other. Consequently, front bus bar 200 and rear bus bar 300 are maintained in parallel to each other by being disposed in conformance with projecting faces 411a of front ribs 411 and projecting faces 412a of rear ribs 412. Insulation paper 480 provided at upper end 410c of first insulating part 410 increases a creepage distance between front overlapping part 240 and rear overlapping part 320 by length L1 (see FIG. 6A) from an upper end edge of first insulating part 410 to an upper end edge of insulation paper 480 to have a desirable creepage distance.

Capacitor element 100 is disposed between front electrode connecting part 210 of front bus bar 200 and rear electrode connecting part 310 of rear bus bar 300. Four electrode terminals 312 of rear electrode connecting part 310 are connected to upper end electrode 101 of capacitor element 100 by soldering S (see FIG. 2B), and four electrode terminals 211 of front electrode connecting part 210 are connected to lower end electrode 102 of capacitor element 100 by soldering S (see FIG. 3).

As illustrated in FIG. 2A and FIG. 2B, front overlapping part 240 and rear overlapping part 320 are provided at positions overlapping with upper end electrode 101 of capacitor element 100 in plan view. In other words, in capacitor unit 10, front overlapping part 240 and rear overlapping part 320 are led out respectively from second relay part 230 and rear electrode connecting part 310 at a position overlapping with upper end electrode 101 in a direction that upper end electrode 101 faces.

As illustrated in FIG. 9, second relay part 230 of front bus bar 200 having an opposite polarity from the polarity of upper end electrode 101 of capacitor element 100 extends along upper end electrode 101. Second insulating part 420 is interposed between second relay part 230 and upper end electrode 101, and second relay part 230 and second relay part 101 are insulated from each other by second insulating part 420. In addition, first relay part 220 of front bus bar 200 extends along periphery 103 of capacitor element 100. Third insulating part 430 is interposed between an upper portion of first relay part 220 and an upper portion of periphery 103. In other words, periphery 103 includes a periphery of upper end electrode 101, and third insulating part 430 is interposed between part of periphery 103 including the periphery of upper end electrode 101 and first relay part 220. Consequently, a creepage distance between upper end electrode 101 and first relay part 220 is increased by length L2 (see FIG. 9) of third insulating part 430 in the up-down direction.

A melted resin that becomes filling resin 30 is poured into case 20 containing capacitor unit 10 from above. The poured melted resin passes through openings 231 of second relay part 230 and openings 421 of second relay part 420. Therefore, the melted resin is easily distributed into a space between second insulating part 420 and capacitor element 100. Likewise, the poured melted resin passes through openings 313 of rear electrode connecting part 310. Therefore, the melted resin is easily distributed into a space between rear electrode connecting part 310 and capacitor element 100. Note that as openings 231, openings 421, and openings 313, being respectively formed in second relay part 230, second insulating part 420, and rear electrode connecting part 310 and having an oval shape elongated in the longitudinal direction, allow for an increase in opening area and thus allow for passage of a larger amount of a melted resin. Openings 231, openings 421, and openings 313, having an oval shape different from shapes having apexes such as a rectangular shape, allow for smooth passage of a melted resin and reduction of formation of portions left unfilled with the melted resin around openings 231, openings 421 and openings 313.

In addition, openings 421 of second insulating part 420, being smaller than openings 231 of second relay part 230 and thus being included within opening areas of openings 231 of second relay part 230, increase the creepage distance between upper end electrode 101 and second relay part 230 at each pair of openings 231 and 421 by length L3 from a peripheral edge of opening 231 to a peripheral edge of opening 421 (see FIG. 2A).

<Effects of Exemplary Embodiment>

The exemplary embodiment described above achieves the following effects.

Front overlapping part 240 of front bus bar 200 and rear overlapping part 320 of rear bus bar 300 overlap with upper end electrode 101 of capacitor element 100, and thus size reduction of film capacitor 1 in the direction along upper end electrode 101 is achieved.

In addition, simply by mounting front bus bar 200 and rear bus bar 300 on insulation module 400, second insulating part 420 extending from first insulating part 410 prevents contact between upper end electrode 101 of capacitor element 100 and second relay part 230 of front bus bar 200 having an opposite polarity from upper end electrode 101, and achieves insulation.

Furthermore, third insulating part 430 interposed between first relay part 220 of front bus bar 200 and periphery 103 of capacitor element 100 also increases the creepage distance between upper end electrode 101 and first relay part 220. Therefore, a desirable creepage distance is achieved between upper end electrode 101 and first relay part 220.

In addition, openings 421 of second insulating part 420 overlap with openings 231 of second relay part 230. Therefore, when a melted resin that becomes filling resin 30 is poured into case 20, the melted resin passes easily through openings 231 of second relay part 230 and openings 421 of second insulating part 420 and thus is distributed easily into a space between second insulating part 420 and capacitor element 100. Consequently, coverage of capacitor unit 10 with filling resin 30 is ensured.

Moreover, openings 421 of second insulating part 420, being smaller than openings 231 of second relay part 230 and thus being included within opening areas of openings 231 of second relay part 230, increase the creepage distance between upper end electrode 101 and second relay part 230 at each pair of openings 231 and 421. Consequently, a desirable creepage distance is achieved between upper end electrode 101 and second relay part 230.

In addition, front face 410a and rear face 410b of first insulating part 410 are provided respectively with front ribs 411 and rear ribs 412 and thus projecting faces 411a of front ribs 411 and projecting faces 412a of rear ribs 412 are parallel to each other. Consequently, front bus bar 200 and rear bus bar 300 are disposed in conformance with projecting faces 411a of front ribs 411 and projecting faces 412a of rear ribs 412 and thus are maintained in parallel to each other.

Although the exemplary embodiment of the present disclosure has been described above, the present disclosure is not limited to the exemplary embodiment described above, and moreover, a variety of modifications can be applied to application examples according to the present disclosure besides the exemplary embodiment described above.

For example, one capacitor element 100 is provided on capacitor unit 10 in the exemplary embodiment described above. However, the number of capacitor elements 100 is not limited to the number specified in the above-described exemplary embodiment, and may be changed as appropriate depending on required electrical capacity. For example, two or more of capacitor elements 100 may be arrayed in the fore-and-aft direction or in the left-and-right direction.

Moreover, each of capacitor elements 100 is produced by layering two metallized films formed by vapor depositing aluminum on a dielectric film and winding or laminating the layered metallized films. Alternatively, each of capacitor elements 100 may be produced by layering a metallized film formed by vapor depositing aluminum on both faces of a dielectric film with an insulating film and winding or laminating the layered films.

Furthermore, in the exemplary embodiment described above, three each of openings 231 and openings 421 having an oval shape are formed on second relay part 230 and second insulating part 420. However, the number of openings 231 and 421 are not limited to three, and the shape of openings 231 and 421 is not limited to an oval as in the exemplary embodiment. For example, two or less, or four or more openings 231 and 421 may be formed. For example, the shapes of openings 231 and 421 may be a true circle or a square.

In the exemplary embodiment described above, four front ribs 411 and four rear ribs 412 are formed on first insulating part 410. However, the number of front ribs 411 and rear ribs 412 are not limited to four as in the exemplary embodiment. For example, three or less, or five or more front ribs 411 and rear ribs 412 may be provided.

In the exemplary embodiment described above, front bus bar 200 relays front electrode connecting part 210, first relay part 220, and second relay part 230, and then is connected to front overlapping part 240. However, front overlapping part 240 may be formed on an extension of first relay part 220 without relaying second relay part 230. In this case, third insulating part 430 may be formed on an extension of first insulating part 410 without forming second insulating part 420 in insulation module 400.

Besides, the exemplary embodiments of the present disclosure can be variously modified appropriately within the technical idea described in claims.

Note that in the description of the above-described exemplary embodiment, a term indicating a direction, such as "upward" or "downward", indicates a relative direction that only depends on a relative positional relationship of constituent members, and does not indicate an absolute direction, such as a vertical direction or a horizontal direction.

The present disclosure is useful for film capacitors used for various electric components of electronic devices, electric devices, industrial devices, electric components used, for example, in vehicles.

What is claimed is:

1. A film capacitor comprising:
   a capacitor element;
   a first bus bar connected to the capacitor element;
   a second bus bar connected to the capacitor element;
   a first overlapping part included in the first bus bar;
   a second overlapping part included in the second bus bar; and
   an insulating part configured to insulate between the first overlapping part and the second overlapping part,
   wherein the first bus bar includes a first electrode connecting part connected to a first end electrode on a first end face of the capacitor element, and the first overlapping part is led out from the first electrode connecting part at a position overlapping the first end electrode in a direction that the first end electrode faces,
   wherein the second bus bar includes a second electrode connecting part connected to a second end electrode on a second end face of the capacitor element opposite to the first end face, and a relay part extending from the second electrode connecting part along a side face of the capacitor element toward the first end electrode, extending along the first end electrode toward the first overlapping part, and connecting the second electrode connecting part and the second overlapping part together, and the second overlapping part is led out from the relay part in the direction that the first end electrode faces,
   wherein the first overlapping part and the second overlapping part overlap each other when viewed from the side face covered by the relay part,
   wherein the first overlapping part and the second overlapping part are disposed over the first end face of the capacitor element, and
   wherein the insulating part includes a first insulating part interposed between the first overlapping part and the second overlapping part and a second insulating part extending from the first insulating part along the first end electrode and being interposed between the first end electrode and the relay part.

2. The film capacitor according to claim 1, wherein the insulating part includes a third insulating part extending from the second insulating part along the side face of the capacitor element and being interposed between the side face of the capacitor element and the relay part.

3. The film capacitor according to claim 2, wherein the third insulating part is interposed between part of the side face of the capacitor element including a periphery of the first end electrode and the relay part.

4. The film capacitor according to claim 1, further comprising:
   a case configured to house the capacitor element, the first bus bar, and the second bus bar; and
   a filling resin to be filled in the case to a level where at least the relay part is embedded,
   wherein the relay part includes a first opening to allow the filling resin to pass, and
   wherein the second insulating part includes a second opening at a position overlapping the first opening to allow the filling resin to pass.

5. The film capacitor according to claim 4, wherein the second opening is smaller than the first opening and is included within an opening area of the first opening.

6. The film capacitor according to claim 1,
   wherein the first overlapping part, the second overlapping part, and the first insulating part each have a flat panel shape,
   wherein the first insulating part is gradually reduced in thickness in a direction away from the second insulating part,
   wherein the first insulating part includes a first rib extending on a face opposing the first overlapping part in the direction in which the first overlapping part is led out, and the second overlapping part includes a second rib extending on a face opposing the second overlapping part in the direction in which the second overlapping part is led out, and
   wherein a face of the first rib opposing the first overlapping part and a face of the second rib opposing the second overlapping part are parallel to each other.

* * * * *